United States Patent
Guizilini et al.

(10) Patent No.: US 12,430,840 B2
(45) Date of Patent: Sep. 30, 2025

(54) SYSTEMS AND METHODS FOR DEPTH SYNTHESIS WITH TRANSFORMER ARCHITECTURES

(71) Applicants: TOYOTA RESEARCH INSTITUTE, INC., Los Altos, CA (US); TOYOTA TECHNOLOGICAL INSTITUTE AT CHICAGO, Chicago, IL (US)

(72) Inventors: Vitor Guizilini, Santa Clara, CA (US); Igor Vasiljevic, Pacifica, CA (US); Adrien D. Gaidon, San Jose, CA (US); Greg Shakhnarovich, Chicago, IL (US); Matthew Walter, Chicago, IL (US); Jiading Fang, Chicago, IL (US); Rares A. Ambrus, San Francisco, CA (US)

(73) Assignees: TOYOTA RESEARCH INSTITUTE, INC., Los Altos, CA (US); TOYOTA JIDOSHA KABUSHIKI KAISHA, Toyota (JP); TOYOTA TECHNOLOGICAL INSTITUTE AT CHICAGO, Chicago, IL (US)

( * ) Notice: Subject to any disclaimer, the term of this patent is extended or adjusted under 35 U.S.C. 154(b) by 210 days.

(21) Appl. No.: 18/156,958

(22) Filed: Jan. 19, 2023

(65) Prior Publication Data
US 2024/0249465 A1     Jul. 25, 2024

(51) Int. Cl.
*G06T 15/10* (2011.01)
*B60W 60/00* (2020.01)
*G06T 7/50* (2017.01)

(52) U.S. Cl.
CPC ........... *G06T 15/10* (2013.01); *B60W 60/001* (2020.02); *G06T 7/50* (2017.01);
(Continued)

(58) Field of Classification Search
None
See application file for complete search history.

(56) References Cited

U.S. PATENT DOCUMENTS 10,984,543 B1 *  4/2021  Srinivasan ............. G06V 20/56
2022/0012848 A1   1/2022  Ranftl

FOREIGN PATENT DOCUMENTS

CN      112907641 A      6/2021
KR      102110690 B1     5/2020

OTHER PUBLICATIONS

Mahmud et al. ("ViewSynth: Learning Local Features from Depth Using View Synthesis") Computer Vision and Pattern Recognition [Submitted on Nov. 22, 2019 (v1), last revised Sep. 1, 2020 (this version, v4)] (Year: 2020).*

(Continued)

*Primary Examiner* — Yanna Wu
(74) *Attorney, Agent, or Firm* — SHEPPARD, MULLIN, RICHTER & HAMPTON LLP; Daniel N. Yannuzzi (57) ABSTRACT

Systems and methods for enhanced computer vision capabilities, particularly including depth synthesis, which may be applicable to autonomous vehicle operation are described. A vehicle may be equipped with a geometric scene representation (GSR) architecture for synthesizing depth views at arbitrary viewpoints. The GSR architecture synthesizes depth views enable advanced functions, including depth interpolation and depth extrapolation. The GSR architecture implements functions (i.e., depth interpolation, depth extrapolation) that are useful for various computer vision applications for autonomous vehicles, such as predicting depth maps from unseen locations. For example, a vehicle includes a processor device synthesizing depth views at multiple viewpoints, where the multiple viewpoints are from image data of a surrounding environment for the vehicle. Further, the vehicle can have a controller device that (Continued)

receives depth views from the processor device and performs autonomous operations in response to analysis of the depth views.

9 Claims, 6 Drawing Sheets

(52) U.S. Cl.
CPC ... *B60W 2420/403* (2013.01); *B60W 2556/40* (2020.02); *G06T 2207/10024* (2013.01); *G06T 2207/10028* (2013.01); *G06T 2207/20212* (2013.01); *G06T 2207/30252* (2013.01)

(56) References Cited

OTHER PUBLICATIONS

Jaegle et al., Perceiver IO: A General Architecture for Structured Inputs & Outputs, 10th International Conference on Learning Representations (ICLR 2022), Apr. 25, 2022, 29 pages (https://doi.org/10.48550/arXiv.2107.14795).

Liu et al., "Deep Convolutional Neural Fields for Depth Estimation from a Single Image," 2015 IEEE/CVF Conference on Computer Vision and Pattern Recognition (CVPR), Jun. 10, 2015, pp. 5162-5170 (https://openaccess.thecvf.com/content_cvpr_2015/papers/Liu_Deep_Convolutional_Neural_2015_CVPR_paper.pdf).

Wang et al., "MVDepthNet: Real-time Multiview Depth Estimation Neural Network," 2018 International Conference on 3D Vision (3DV), Sep. 5, 2018, 18 pages (https://doi.org/10.1109/3DV.2018.00037).

Varma et al., "Transformers in Self-Supervised Monocular Depth Estimation with Unknown Camera Intrinsics," 17th International Conference on Computer Vision Theory and Applications (VISAPP 2022), Feb. 7, 2022, 12 pages (https://arxiv.org/pdf/2202.03131.pdf).

Rombach et al., "Geometry-Free View Synthesis: Transformers and no 3D Priors," 2021 IEEE/CVF International Conference on Computer Vision (ICCV), Oct. 13, 2021, pp. 14356-14366 (https://openaccess.thecvf.com/content/ICCV2021/papers/Rombach_Geometry-Free_View_Synthesis_Transformers_and_No_3D_Priors_ICCV_2021_paper.pdf).

Yifan et al., "Input-Level Inductive Biases for 3D Reconstruction," 2022 IEEE/CVF Conference on Computer Vision and Pattern Recognition (CVPR) Jun. 22, 2022, 13 pages (https://openaccess.thecvf.com/content/CVPR2022/papers/Yifan_Input-Level_Inductive_Biases_for_3D_Reconstruction_CVPR_2022_paper.pdf).

Mildenhall et al., "NeRF: Representing Scenes as Neural Radiance Fields for View Synthesis," 16th European Conference on Computer Vision (ECCV), Aug. 24, 2020, 17 pages (https://www.ecva.net/papers/eccv_2020/papers_ECCV/papers/123460392.pdf).

Ranftl et al., "Vision Transformers for Dense Prediction," 2021 IEEE/CVF International Conference on Computer Vision, Oct. 13, 2021, pp. 12179-12188 (https://openaccess.thecvf.com/content/ICCV2021/papers/Ranftl_Vision_Transformers_for_Dense_Prediction_ICCV_2021_paper.pdf).

Long et al., "Multi-View Depth Estimation using Epipolar Spatio-Temporal Networks," 2021 IEEE/CVF Conference on Computer Vision and Pattern Recognition (CVPR), pp. 8258-8267 (https://openaccess.thecvf.com/content/CVPR2021/papers/Long_Multi-view_Depth_Estimation_using_Epipolar_Spatio-Temporal_Networks_CVPR_2021_paper.pdf).

Saxena et al., "Learning Depth from Single Monocular Images," 19th Annual Conference on Neural Information Processing Systems (NIPS 2005), Dec. 2005, 8 pages (https://papers.nips.cc/paper/2005/file/17d8da815fa21c57af9829fb0a869602-Paper.pdf).

Godard et al., "Digging into Self-Supervised Monocular Depth Estimation," 2019 IEEE/CVF International Conference on Computer Vision (ICCV), Oct. 30, 2019, pp. 3828-3838 (https://openaccess.thecvf.com/content_ICCV_2019/papers/Godard_Digging_Into_Self-Supervised_Monocular_Depth_Estimation_ICCV_2019_paper.pdf).

Guizilini et al., "3D Packing for Self-Supervised Monocular Depth Estimation," Proceedings of the IEEE/CVF Conference on Computer Vision and Pattern Recognition (CVPR), Jun. 16, 2020. pp. 2485-2494 (https://openaccess.thecvf.com/content_CVPR_2020/papers/Guizilini_3D_Packing_for_Self-Supervised_Monocular_Depth_Estimation_CVPR_2020_paper.pdf).

\* cited by examiner

SYSTEMS AND METHODS FOR DEPTH SYNTHESIS WITH TRANSFORMER ARCHITECTURES

TECHNICAL FIELD

The present disclosure relates to systems and methods supporting enhanced computer vision capabilities which may be applicable to autonomous vehicle operation, for example providing depth synthesis.

BACKGROUND

Computer vision is a technology that involves techniques which enable computers to gain high-level understanding from digital images and/or videos. For example, a computer system that is executing computer vision can autonomously perform various acquisition, processing, and analysis tasks using digital images and/or video, thereby extracting high-dimensional data from the real-world. There are several different types of technologies that fall under the larger umbrella of computer vision, including: depth synthesis; depth estimation; scene reconstruction; object detection; event detection; video tracking; three-dimensional (3D) pose estimation; 3D scene modeling; motion estimation; and the like.

Computer vision is also at the core of autonomous vehicle technology. For instance, autonomous vehicles can employ computer vision capabilities and leverage object detection algorithms in combination with advanced cameras and sensors to analyze their surroundings in real-time. Accordingly, by utilizing computer vision, autonomous vehicles can recognize objects and surroundings (e.g., pedestrians, road signs, barriers, and other vehicles) in order to safely navigate the road. Continuing advancements in vehicle cameras, computer vision, and Artificial Intelligence (AI) have brought autonomous vehicles closer than ever to meeting safety standards, earning public acceptance, and achieving commercial availability. Moreover, recent years have witnessed enormous progress in AI, causing AI-related fields such as computer vision, machine learning (ML), and autonomous vehicles to similarly become rapidly growing fields.

BRIEF SUMMARY OF EMBODIMENTS

According to various embodiments in the disclosed technology, a vehicle is disclosed herein that includes a processor device configured for synthesizing depth views at multiple viewpoints. The multiple viewpoints are associated with image data of a surrounding environment for the vehicle. The system further includes a controller device receiving depth views from the processor device. Additionally, the controller device performs autonomous operations in response to analysis of the depth views.

In another embodiment, a system is disclosed that includes an encoder that is configured for encoding image embeddings and camera embeddings and outputting encoded information. The system also includes a decoder that is configured for producing view synthesis estimations and depth synthesis estimations at multiple viewpoints from the encoded information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The technology disclosed herein, in accordance with one or more various implementations, is described in detail with reference to the following figures. The figures are provided for purposes of illustration only and merely depict typical or example implementations of the disclosed technology. These figures are provided to facilitate the reader's understanding of the disclosed technology and shall not be considered limiting of the breadth, scope, or applicability thereof. It should be noted that for clarity and ease of illustration these figures are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

As referred to herein, computer vision is technology that is related to the acquisition, processing, and analysis of image data, such as digital images and/or video, for the extraction of a high-level and high-dimensional data representing the real-world. Estimating 3D structure from a pair of images is a cornerstone problem of computer vision. Traditionally, this is treated as a correspondence problem, whereby one applies a homography to stereo rectify the image pair based on known calibration, and then matches pixels (or patches) along epipolar lines to obtain disparity estimates. Given a sufficiently accurate calibration (i.e., intrinsics and extrinsics), this disparity map can then be converted into a per-pixel depth map. Contemporary approaches to stereo are specialized variants of classical methods, relying on correspondence and computing-stereo matching and cost volumes, epipolar losses, bundle adjustment objectives, or projective multi-view constraints, among others, that are either baked into the model architecture or enforced as part of the loss function.

Applying the principles of classical vision in this way has given rise to architectures that achieve state-of-the-art results on tasks such as stereo depth estimation, optical flow, and multi-view depth. However, this success comes at a cost; and each architecture is specialized and purpose-built for a single task, and typically relies on an accurate underlying dataset-specific calibration. Though great strides have been made in alleviating the dependence on strong geometric assumptions by learning the calibration along with the target task, two recent trends allow decoupling the task from the network architecture, including: 1) implicit representations of geometry; and 2) generalist network architectures. The disclosed embodiments draw upon both of these directions. Implicit representations of geometry and coordinate-based networks have recently achieved incredible popularity in the vision community. This growth in the realm of implicit representations is pioneered by advancements in the neural radiance fields (NeRF), where a point-based and ray-based parameterization along with a volume rendering objective allow simple MLP-based networks to achieve state-of-the-art view synthesis results. This coordinate-based representation can be extended to the pixel domain, allowing predicted views to be conditioned on image features.

The second emerging trend in computer vision has been the use of generalist architectures. This trend has been developing as an attention-based architecture for Natural Language Processing (NLP), where transformers have been used for a diverse set of tasks including depth estimation, optical flow, and image generation. Transformers have also been applied to geometry-free view synthesis, demonstrating that attention can learn long-range correspondence between views for 2D-3D tasks. Scene Representation Transformers (SRT) use the transformer encoder-decoder model to learn scene representations for view synthesis from sparse, high-baseline data with no geometric constraints. However, according to big O notation $O(N^2)$ scaling of the self-attention module of generic transformers, experiments are limited to low-resolution images and require very long training periods (i.e., millions of iterations on a large-scale TPU architecture).

To alleviate the scalability of self-attention, a Perceiver architecture has been introduced which disentangles the dimensionality of the latent representation from that of the inputs, enabling training on arbitrarily-sized inputs by fixing the size of the latent representation. Furthermore, a Perceiver IO architecture has emerged, which extends the aforementioned Perceiver architecture to allow for arbitrary outputs. Experiments have shown that Perceiver IO can obtain optical flow results that exceed traditional cost-volume based methods. In addition, Perceiver IO has been recently used for stereo depth estimation, replacing traditional geometric constraints with input-level inductive biases.

These specialized architectures that are used to implement geometric computer vision tasks, as described above, incorporate the strengths of classical approaches, but also inherit their limitations. Multi-view and video-based models rely on loss-level geometric constraints, using neural networks to map image data to classical structures such as cost volumes. While these specialized architectures have made impressive strides in the past few years, they are typically slow, extremely application specific, memory-intensive, and sensitive to calibration errors. A recent trend in learning-based computer vision is to replace loss and architecture-level specialization with generalist architectures, and instead encode geometric priors at the input level. These generalist architectures have achieved impressive performance on both stereo depth estimation and light-field view synthesis. Embodiments of the present disclosure leverage this concept of more generalized architectures for depth estimation from sequence data. Additionally, data augmentation techniques aimed at encoding multi-view geometry are introduced to promote the learning of a generalizable and geometrically consistent latent scene representation, thus effectively increasing the diversity of available supervision. Furthermore, our learned representation enables depth interpolation and extrapolation, predicting depth maps from unseen locations Embodiments of the present disclosure are directed to a geometric scene representation (GSR) architecture for synthesizing depth views at arbitrary viewpoints. The GSR architecture is distinctly configured to synthesize depth views in a manner that extends conventional static depth estimation and enable advanced functions, including depth interpolation and depth extrapolation. Depth interpolation enables interpolation of a depth view between the source views and depth extrapolation enables extrapolation of a depth view beyond the source views. Therefore, the GSR architecture implements functions (i.e., depth interpolation, depth extrapolation) which can be useful for various computer vision applications for autonomous vehicles, such as predicting depth maps from unseen locations. Furthermore, the disclosed GSR architecture can achieve state-of-the-art results on stereo and video depth estimation without explicitly enforcing any geometric constraints, but rather by conditioning on them at an input and data level.

Figure 1:
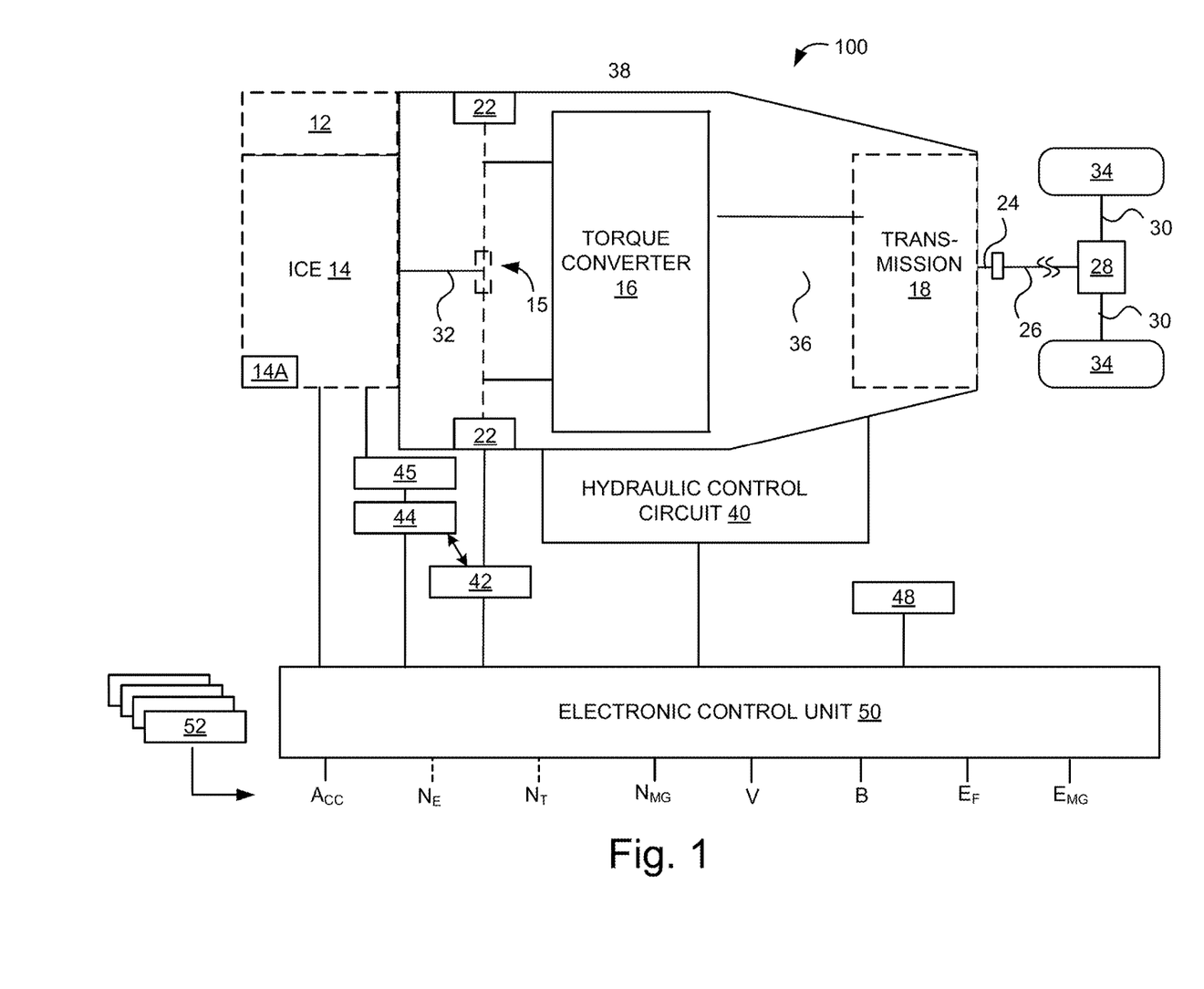
FIG. 1 illustrates an example vehicle with which embodiments of the disclosure may be implemented.

The systems and methods related to the GSR architecture and depth synthesis functions as disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example autonomous vehicle 100 in which embodiments of the disclosed technology may be implemented is illustrated in FIG. 1. Although the example described with reference to FIG. 1 is a type of autonomous vehicle, the systems and methods described herein can be implemented in other types of vehicles including semi-autonomous vehicles, vehicles with automatic controls (e.g., dynamic cruise control), or other vehicles. Also, the example vehicle 100 described with reference to FIG. 1 is a type of hybrid electric vehicle (HEV). However, this is not intended to be limiting, and the disclosed embodiments can be implemented in other types of vehicles including gasoline- or diesel-powered vehicles, fuel-cell vehicles, electric vehicles, or other vehicles.

According to an embodiment, vehicle 100 can be an autonomous vehicle implementing the GSR architecture and depth synthesis functions, as disclosed herein. As used herein, "autonomous vehicle" means a vehicle that is configured to operate in an autonomous operational mode. "Autonomous operational mode" means that one or more computing systems of the vehicle 100 are used to navigate and/or maneuver the vehicle along a travel route with a level of input from a human driver which varies with the operational mode. As such, vehicle 100 can have a plurality of autonomous operational modes, where each mode correspondingly responds to a controller, for instance electronic control unit 50, with a varied level of automated response. In some embodiments, the vehicle 100 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 100, responses can be highly, or fully, automated. For example, a controller can be configured to communicate controls so as to operate the vehicle 100 autonomously and safely. After the controller communicates a control to the vehicle 100 operating as an autonomous vehicle, the vehicle 100 can automatically perform the desired adjustments (e.g., accelerating or decelerating) with no human driver interaction. Accordingly, vehicle 100 can operate any of the components shown in FIG. 1 autonomously, such as the engine 14.

Alternatively, or in addition to the above-described modes, vehicle 100 can have one or more semi-autonomous operational modes. "Semi-autonomous operational mode" means that a portion of the navigation and/or maneuvering of the vehicle 100 along a travel route is performed by one or more computing systems, and a portion of the navigation and/or maneuvering of the vehicle 100 along a travel route is performed by a human driver. One example of a semi-autonomous operational mode is when an adaptive cruise control system is activated. In such case, the speed of a vehicle 100 can be automatically adjusted to maintain a safe distance from a vehicle ahead based on data received from on-board sensors, but the vehicle 100 is otherwise operated manually by a human driver. Upon receiving a driver input to alter the speed of the vehicle (e.g., by depressing the brake pedal to reduce the speed of the vehicle), the speed of the vehicle is reduced. Thus, with vehicle 100 operating as a semi-autonomous vehicle, a response can be partially automated. In an example, the controller communicates a newly generated (or updated) control to the vehicle 100 operating as a semi-autonomous vehicle. The vehicle 100 can automatically perform some of the desired adjustments (e.g., accelerating) with no human driver interaction. Alternatively, the vehicle 100 may notify a driver that driver input is necessary or desired in response to a new (or updated) safety control. For instance, upon detecting a predicted trajectory that impacts safety, such as potential collision, vehicle 100 may reduce the speed to ensure that the driver is travelling cautiously. In response, vehicle 100 can present a notification in its dashboard display that reduced speed is recommended or required, because of the safety constraints. The notification allows time for the driver to press the brake pedal and decelerate the vehicle 100 to travel at a speed that is safe.

Additionally, FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 100 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 100 and is powered electrically via a battery 44. Battery 44 may be implemented as one or more batteries or other power storage devices including, for example, lead-acid batteries, lithium-ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. As will be described in further detail, the sensors 52 can be cameras (or other imaging devices) that are used to obtain image data, such as digital images and/or video. This image data from the sensors 52 can then be processed, for example by the electronic control unit 50, in order to implement the disclosed depth synthesis capabilities disclosed herein. Accordingly, the electronic control unit 50 can execute enhanced computer vision functions, such as depth extrapolation for future timesteps and predicting unseen viewpoints.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
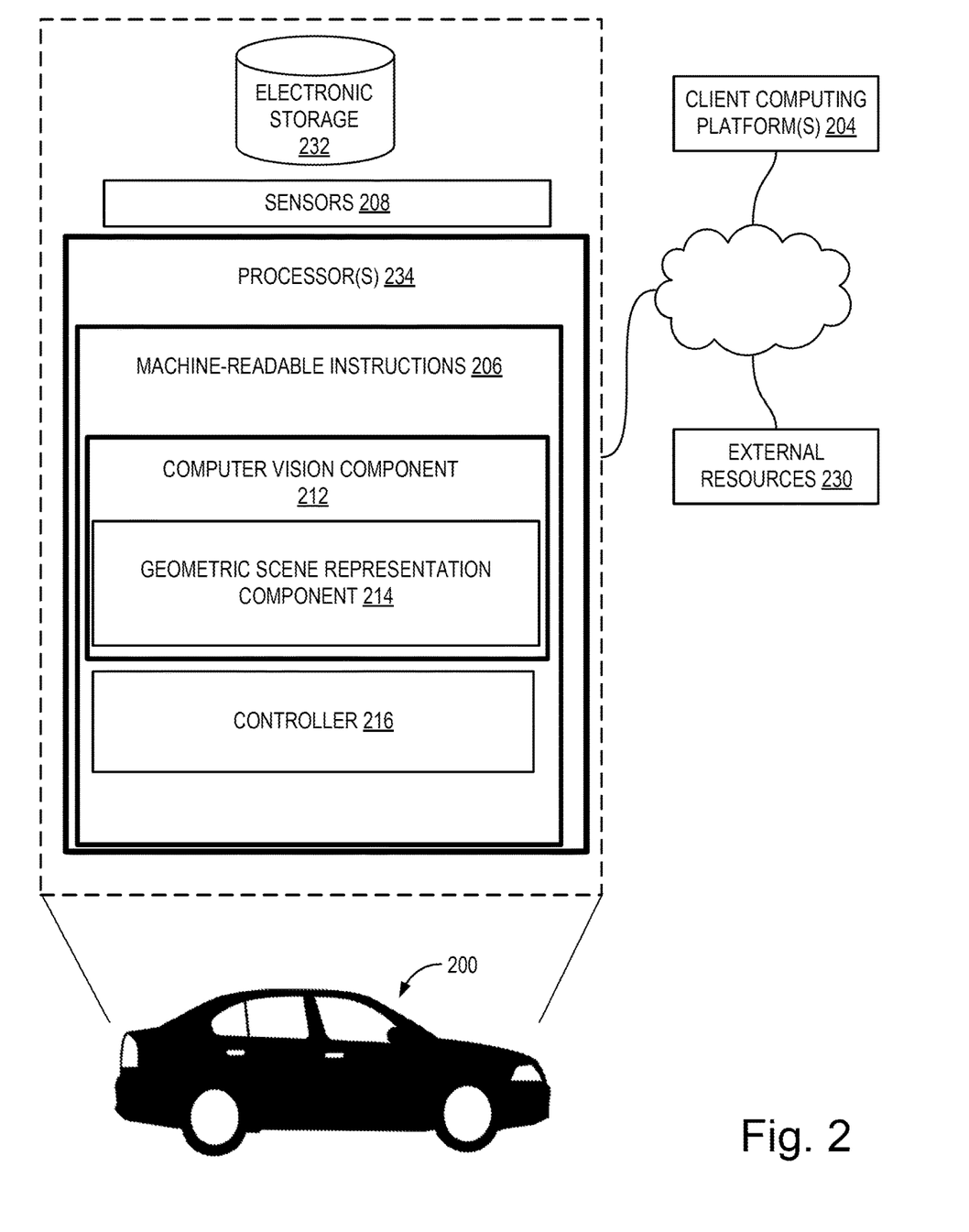
FIG. 2 illustrates an example vehicle configured for partially controlling operation of the vehicle based on the computer vision and depth synthesis capabilities implemented by a Geometric Scene Representation (GSR) component, in accordance with one or more implementations disclosed herein.

FIG. 2 illustrates a vehicle 200, for instance an autonomous vehicle, configured for implementing the disclosed GSR architecture and depth synthesis capabilities. In particular, FIG. 2 depicts the vehicle 200 including a Geometric Scene Representation (GSR) component 214. According to the disclose embodiments, the GSR component 214 is configured to execute several enhanced computer vision capabilities, including: depth estimation; depth interpolation, where given a set of RGB views (e.g., from digital images and/or video) the component 214 can interpolate a depth view between the source views; and depth extrapolation, where given a set of RGB views (e.g., from digital images and/or video) the component 214 can extrapolate a depth view beyond the source views.

In some implementations, vehicle 200 may also include sensors 208, electronic storage 232, processor(s) 234, and/or other components. Vehicle 200 may be configured to communicate with one or more client computing platforms 204 according to a client/server architecture and/or other architectures. In some implementations, users may access vehicle 200 via client computing platform(s) 204.

Sensors 208 may be configured to generate output signals conveying operational information regarding the vehicle. The operational information may include values of operational parameters of the vehicle. The operational parameters of vehicle 100 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 200 tires and roadway, distance from center of gravity of vehicle 200 to front axle, distance from center of gravity of vehicle 200 to rear axle, total mass of vehicle 200, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 200. In some implementations, at least one of sensors 208 may be a vehicle system sensor included in an engine control module (ECM) system or an electronic control module (ECM) system of vehicle 200. In some implementations, at least one of sensors 208 may be vehicle system sensors separate from, whether or not in communication with, and ECM system of the vehicle. Combinations and derivations of information (or of parameters reflecting the information) are envisioned within the scope of this disclosure. For example, in some implementations, the current operational information may include yaw rate and/or its derivative for a particular user within vehicle 100.

In some implementations, sensors 208 may include, for example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a proximity sensor, global positioning system (or other positional) sensor, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensor (including a blood pressure sensor, pulse oximeter, heart rate sensor, driver alertness sensor, ECG sensor, etc.), degree-of-freedom sensor (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 200. In some implementations, sensors may also include sensors within nearby vehicles (e.g., communicating with the subject vehicle via V to V or other communication interface) and or infrastructure sensors (e.g., communicating with the subject vehicle via the V2I or other communication interface).

Sensors 208 may be configured to generate output signals conveying visual and/or contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.)), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. The roadway may also include surface type such as blacktop, concrete, dirt, gravel, mud, etc., or surface conditions such as wet, icy, slick, dry, etc. Lane position of a vehicle on a roadway, by way of example, may be that the vehicle is in the far-left lane of a four-lane highway, or that the vehicle is straddling two lanes. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 208 may include virtual sensors, imaging sensors, depth sensors, cameras, and/or other sensors. As used herein, the term "camera", "sensor" and/or "image sensor" and/or "imaging device" may include any device that captures images, including but not limited to a single lens-based camera, a calibrated camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. The visual information captured by sensors 208 can be in the form of digital images and/or video that includes red, green, blue (RGB) color values representing the image. Information captured by one or more sensors may be marked, time-stamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 232, such that captured information may be stored, at least initially, in the integrated embedded storage of a particular vehicle, e.g., vehicle 200. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Vehicle 200 may be configured by machine-readable instructions 206. Machine-readable instructions 206 may include one or more instruction components. The instruction components may include computer program components. The instruction components may include one or more of: a computer vision component 212; a GSR component 214; a controller 216, and/or other instruction components.

Figure 3:
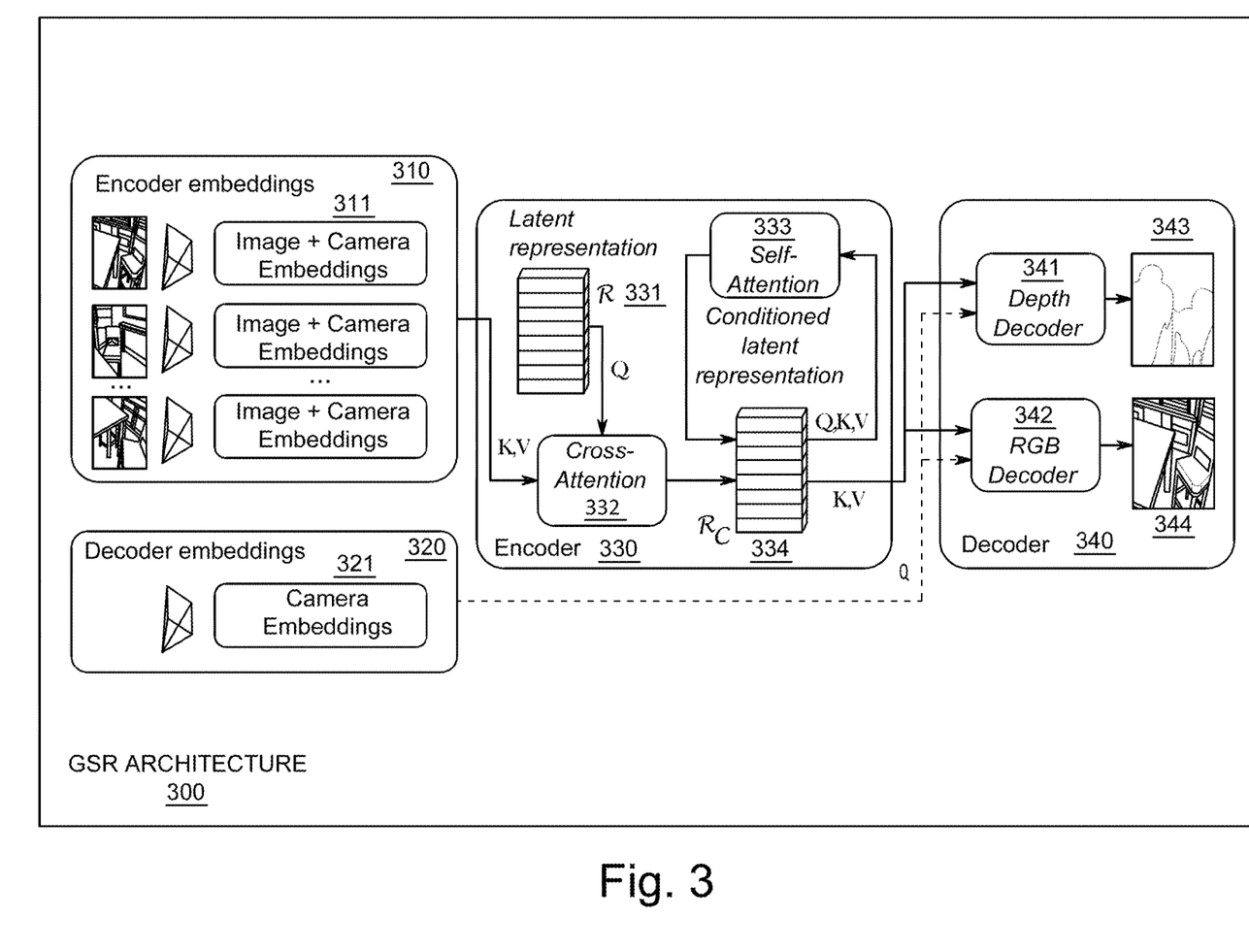
FIG. 3 illustrates an example architecture for the GSR component of the vehicle depicted in FIG. 2, in accordance with one or more implementations disclosed herein.

As a general description, the illustrated components within the machine-readable instructions 206 include the computer vision component 212 and the GSR component 214. As previously described, the GSR component 214 is configured to execute several enhanced computer vision capabilities, including: depth estimation; depth interpolation, where given a set of RGB views (e.g., from digital images and/or video) the component 214 can interpolate a depth view between the source views; and depth extrapolation, where given a set of RGB views (e.g., from digital images and/or video) the component 214 can extrapolate a depth view beyond the source views. FIG. 2 also shows that the machine-readable instructions 206 includes a computer vision component 212, which is configured to perform the larger breadth of computer vision functions, such as object detection, which can drive the various autonomous vision and controls utilized by autonomous vehicles. The computer vision component 212 can also be described as implementing the disclosed depth synthesis capabilities vis-à-vis the GSR component 214 (the GSR component 214 is an element of the computer vision component 212). As an example, the computer vision component 212 can implement object detection (in combination with advanced cameras and sensors), enabling the vehicle 200 to analyze its surroundings and respond with autonomous vehicle controls. Further, as an example, the GSR component 214 allows the vehicle 200 to have depth estimation and/or scene representation capabilities (e.g., enhanced computer vision functions), such as creating dense depth maps that complete unseen portions of a scene. Accordingly, the computer vision component 212 and the GSR component 214 can function in concert with the other components of the vehicle 200, such as sensors 208 (e.g., camera), in order to support vision AI and enhanced computer vision capabilities that can be employed during the autonomous operation of vehicle 200. An example architecture for the GSR component 214 is depicted in FIG. 3. As a general description, the architecture of the GSR component includes camera embeddings, a Perceiver IO transformer architecture, a CNN image encoder, and depth and RGB decoders. The associated structure and function of the elements within the GSR component's 214 architecture are discussed in greater detail in reference to FIG. 3.

Now referring to FIG. 3, an example architecture 300 for the abovementioned GSR component is depicted. Specifically, FIG. 3 illustrates that the framework for the GSR architecture 300 includes several elements and embeddings used to encode and decode information for depth and view synthesis. In the example of FIG. 3, the GSR architecture 300 includes: encoder embeddings 310, including multiple image embeddings and camera embeddings 311; decoder embeddings 320, including camera embeddings 321; an encoder 330 utilizing the Perceiver IO transformer architecture; and a decoder 340, including a depth decoder 341 and a RGB decoder 342. The GSR architecture 300 can be described as a generalist transformer-based architecture that is configured to learn a depth estimator from an arbitrary number of pose images. For instance, the camera embeddings 311 can include pose and intrinsics. Accordingly, the GSR architecture 300 has a framework that achieves state-of-the-art depth estimation results, and furthers this capability in the context of interpolation (e.g., estimating depth between timesteps), and extrapolation (e.g., estimating depth for future timesteps). The GSR architecture 300 is particularly designed for flexibility, which allows data from different sources to be used as input, and enables different output tasks to be estimated from the same latent space. In operation, during the encoding stage, the GSR architecture 300 can take RGB images from calibrated cameras, with known intrinsics and relative poses. The architecture 300 processes this information according to a modality into different pixel-wise embeddings that serve as input to the GSR architecture 300. FIG. 3 depicts the image and camera embeddings 311, serving as input into the encoder 330 for depth and view synthesis. Examples of image embeddings and camera embeddings 311 are depicted in greater detail in FIG. 4A and FIG. 4B, respectively. This information, namely encoder embeddings 310, which is ultimately encoded by encoder 330 can be queried using the camera embeddings 321 of the decoder embeddings 320, which produces estimates from arbitrary viewpoints.

The GSR architecture 300 utilizes a transformer backbone for the encoder 330. In an embodiment, the transformer backbone for the GRS architecture 300 is implemented as a Perceiver IO backbone, such as a Perceiver IO (15) architecture or a Perceiver IO (16) architecture. The Perceiver IO architecture alleviates one of the main weaknesses of transformer-based methods, namely the quadratic scaling of self-attention with input size. This is achieved by using a fixed-size $N_l \times C_l$ latent representation R 331, and learning to project high-dimensional $N_e \times C_e$ embeddings onto this latent representation R 331 using cross-attention layers 332. The architecture 300 then performs self-attention in this lower-dimensional space, using the self-attention layer 333. Self-attention produces a conditioned latent representation $R_c$ 334, that can be queried using $N_d \times C_d$ embeddings during the decoding stage to generate estimates, again using cross-attention layers 332.

FIG. 3 depicts the decoder 340, comprising depth decoder 341 and RGB decoder 342, receiving conditioned latent representation $R_c$ 334 information from the encoder 330 as input. The depth decoder 341 can generate depth synthesis outputs 343 (e.g., depth estimations), and the RGB decoder can generate view synthesis outputs 344. In an embodiment, task-specific decoders, each consisting of one cross-attention layer between the queries $N_d \times C_d$ and the $N_l \times C_l$ conditioned latent representation $R_c$, followed by a linear layer that creates an output of size $N_d \times C_o$, and a sigmoid activation function $\sigma(x)=1$ 1+e−x to produce values between [0, 1]. For example, $C_o^d=1$ can set for the depth estimation task and $C_o^s=3$ for view synthesis. Depth estimates are scaled between a minimum $d_{min}$ and maximum $d_{max}$ range. In some embodiments, additional decoders can be incorporated to GSR architecture 300 without substantial modification to the underlying architecture, enabling the generation of multi-task estimates from arbitrary viewpoints.

Data augmentation is a core component of deep learning pipelines. Data augmentation can improve model robustness by applying transformations to the training data consistent with the data distribution in order to introduce desired equivariant properties. In computer vision and depth estimation in particular, standard data augmentation techniques are usually constrained to the 2D space and include color jittering, flipping, rotation, cropping, and resizing. The disclosed GSR architecture 300 is distinctly designed to implement a geometric 3D augmentations approach, in an effort to increase robustness to errors in scene geometry, in terms of camera localization (i.e., extrinsics) and parameters (i.e., intrinsics). The GSR architecture 300 performs encoding scene geometry at the input-level, which allows the architecture 300 to learn a multi-view consistent geometric latent scene representation. Therefore, the GSR architecture 300 generates a series of 3D augmentations which increase the number of training views while maintaining the spatial relationship between cameras, thus enforcing desired equivariant properties within this setting.

In addition to traditional depth estimation from RGB images, the GSR architecture 300 can also generate depth maps from arbitrary viewpoints, since it only requires camera embeddings, such as camera embeddings 321, to decode estimates. As alluded to above, the depth synthesis capabilities that are implemented by the GRS architecture 300 can include: interpolation, i.e., estimating depth maps between timesteps; and extrapolation, i.e., estimating depth maps in future timesteps. When interpolating, for example, the GSR architecture 300 encodes frames at [t−5, t+5], and decode depth maps corresponding to the camera location at timesteps [t−4, . . . , t+4]. When extrapolating, for example, the GSR architecture 300 encodes frames at [t−5, . . . , t−1], and decode depth maps corresponding to the camera location at timesteps [t, . . . , t+8]. Thus, the GSR architecture 300 can be used to either explicitly project information from encoded frames onto new viewpoints (projection), or query from the latent representation at that same location (query).

Figure 5:
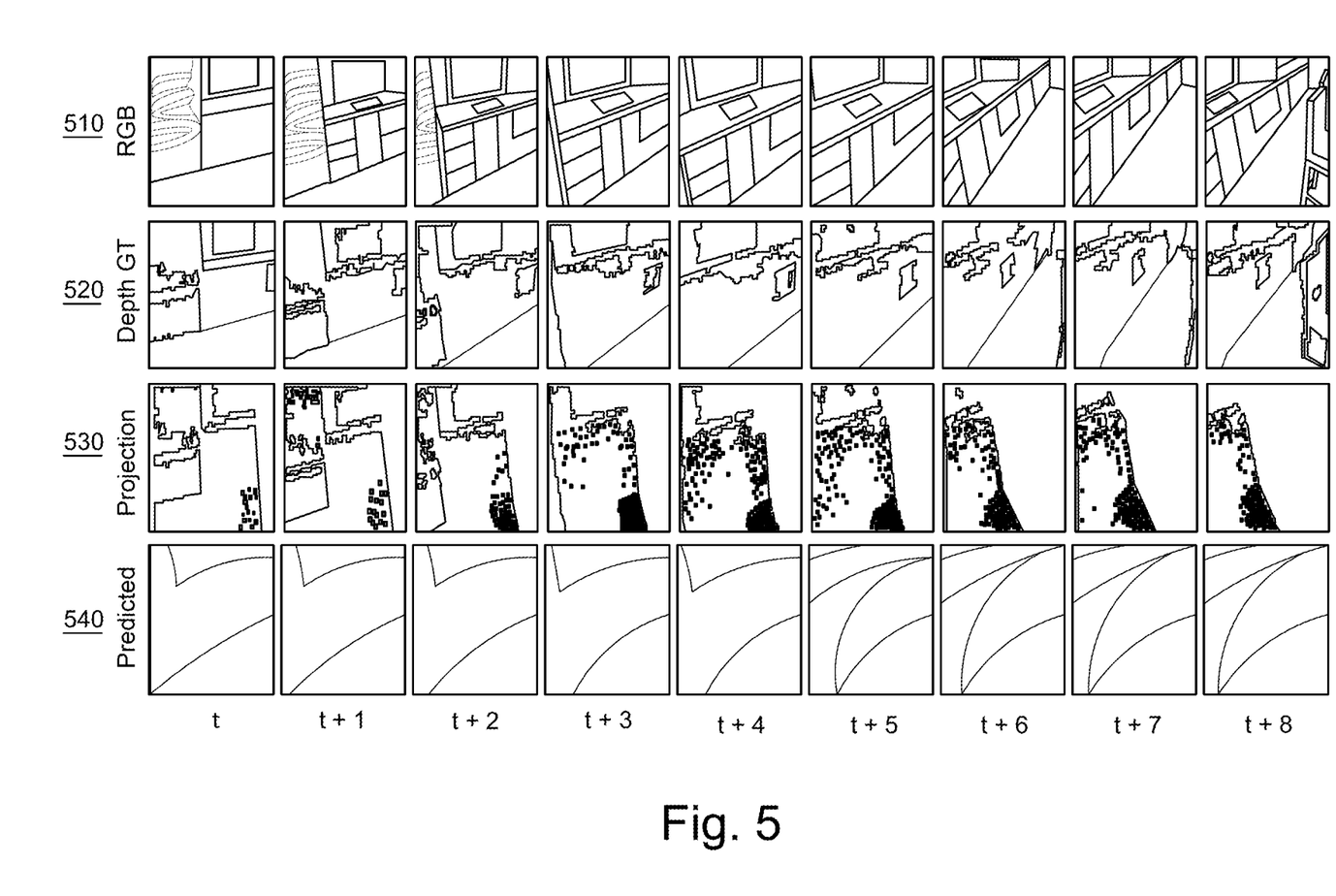
FIG. 5 illustrates example depth maps that can be generated as a result of depth estimation for novel viewpoints implemented by the GSR architecture depicted in FIG. 3, in accordance with one or more implementations disclosed herein.

FIG. 5 depicts an example depth extrapolation that can be achieved by the GSR architecture 300. Particularly, FIG. 5 illustrates example of depth extrapolation to future timesteps. FIG. 5 shows multiple forms of maps, including RGB images 510, ground-truth depth map 520, a projected (sparse) depth map 530, and a predicted (dense) depth map 540. The GSR architecture 300 can complete unseen portions of the scene in a geometrically-consistent way, generating dense depth maps from novel viewpoints. FIG. 5 also illustrates the results in terms of root mean squared error (RMSE) between the synthesized depth map, namely predicted depth map 540, and the ground-truth depth map 520, considering only valid projected pixels. FIG. 5 serves to illustrate that the multi-frame depth estimation significantly outperforms other single-frame baselines. However, and most importantly, results obtained by implicit querying consistently outperform those obtained via explicit projection. This indicates that the GSR architecture's 300 learned latent representation is able to improve upon available encoded information. Furthermore, FIG. 5 shows that estimates for areas without valid explicit projection information can be generated by the GSR architecture 300.

Figure 4A:
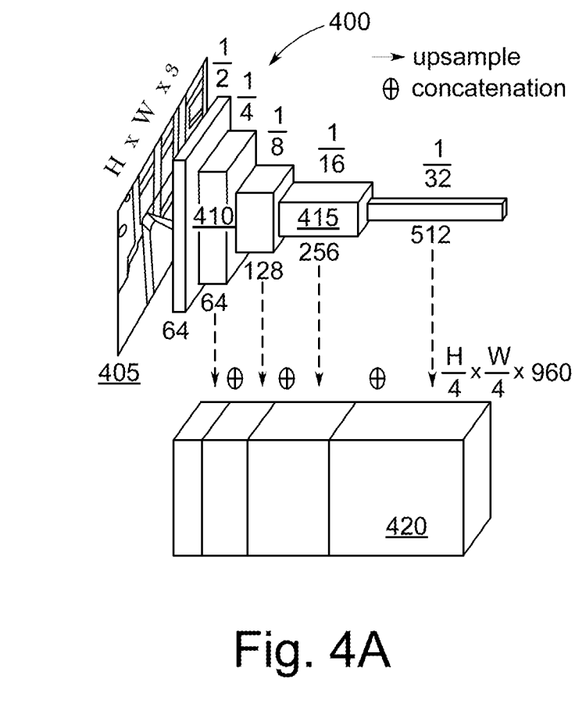
FIG. 4A illustrates an example of image embeddings that can be employed as input to the GSR architecture depicted in FIG. 3, in accordance with one or more implementations disclosed herein.

Referring now to FIG. 4A, an example of image embeddings 400 which can be employed as input embeddings in the abovementioned GSR architecture (shown in FIG. 3) is depicted. FIG. 4A shows an input 3×H×W image 405, which can be processed using an encoder to produce a list of features maps 410 at increasingly lower resolutions and higher dimensionality. In the example of FIG. 4A, feature maps 410 are at ¼ the original resolution. Further, the feature maps 410 are concatenated with lower-resolution feature maps 415, after upsampling using bilinear interpolation. In FIG. 4A, the lower-resolution feature maps 415 are at ⅛, 1/16, and 1/32 of the original resolution. The resulting image embeddings 420 are of shape H/4×W/4×960, and are used in combination with camera embeddings (shown in FIG. 4B) from each corresponding pixel to encode visual information.

Figure 4B:
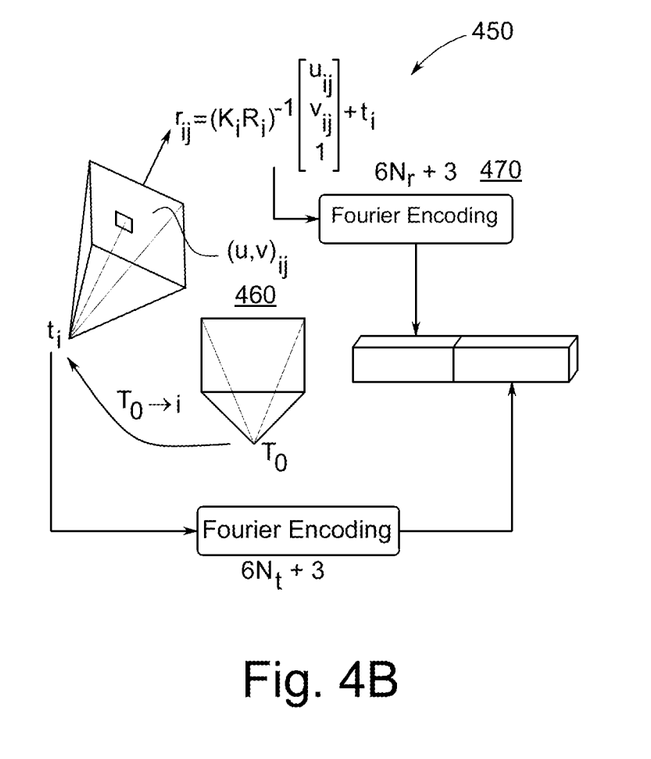
FIG. 4B illustrates an example of camera embeddings that can be employed as input to the GSR architecture depicted in FIG. 3, in accordance with one or more implementations disclosed herein.

FIG. 4B illustrates an example of camera embeddings 450 which can be employed as input embeddings in the abovementioned GSR architecture (shown in FIG. 3). The camera embeddings 450 capture multi-view scene geometry (e.g., camera intrinsics and extrinsics) in a way that can be used by the framework of the GSR architecture as inputs in addition to the image embeddings of FIG. 4A, during the learning process. For example, let $x_{ij}=(u, v)$ be an image coordinate corresponding to pixel i in camera j, with assumed known pinhole 3×3 intrinsics $K_j$ and 4×4 transformation matrix $T_j$, which relative to a canonical camera $T_0$ 460 is represented mathematically as:

$$T_j = \begin{bmatrix} R & t \\ 0 & 1 \end{bmatrix} \quad (1)$$

Additionally, its origin $o_j$ and direction $r_{ij}$ are represented mathematically as:

$$o_j = -R_j t_j, \; r_{ij} = (K_j R_j)^{-1} \begin{bmatrix} u_{ij} \\ v_{ij} \\ 1 \end{bmatrix} + t_j \quad (2)$$

Note that this formulation of equation (2) differs slightly from the standard convention, which does not consider the camera translation $t_j$ when generating viewing rays $r_{ij}$. This variation leads to better performance for the task of depth estimation. These two vectors are then Fourier-encoded 470 to produce higher-dimensional vectors. The Fourier encoding 470 is performed dimension-wise with a mapping that is represented mathematically as:

$$x \to [x, \sin(f_1 \pi x), \cos(f_1 \pi x), \ldots, \sin(f_K \pi x) \cos(f_K \pi x)]^T \quad (3)$$

where K is the number of Fourier frequencies used ($K_o$ for the origin, and $K_r$ for the ray directions), equally spaced between $$\left[1, \frac{u}{2}\right]$$

The resulting camera embedding 480 has a dimensionality that is represented mathematically as:

$$2(3(K_o + 1) + 3(K_r + 1) = 6(K_o + K_r + 2) \quad (4)$$

During the encoding stage, camera embeddings 450 are produced per-pixel assuming a camera with ¼ the original input resolution, resulting in a total of HW/16 vectors. During the decoding stage, camera embeddings 450 from cameras with arbitrary calibration (i.e., intrinsics and extrinsics) can be generated and queried to produce per-pixel estimates.

Thus, the disclosed GSR architecture 300, as disclosed herein implements a generalist scene representation framework for multi-view depth estimation. Rather than explicitly enforcing geometric constraints at an architecture or loss level (e.g. cost volumes, epipolar constraints, bundle adjustment), geometric embeddings are used to condition network inputs, alongside visual information. To promote the learning of a geometrically-consistent latent representation, the GSR architecture 300 utilizes a series of 3D augmentations designed to promote viewpoint, rotation and translation invariance. Furthermore, view synthesis, which can be performed as an auxiliary task by the GSR architecture 300, can lead to improvement in depth estimation without requiring additional ground-truth information. The generalized design of the GSR architecture's 300 framework enables many exciting venues for future work, including the use of additional tasks (such as semantic segmentation), extension to dynamic scenes, spatiotemporal representations, variational inference, and uncertainty estimation.

Figure 6:
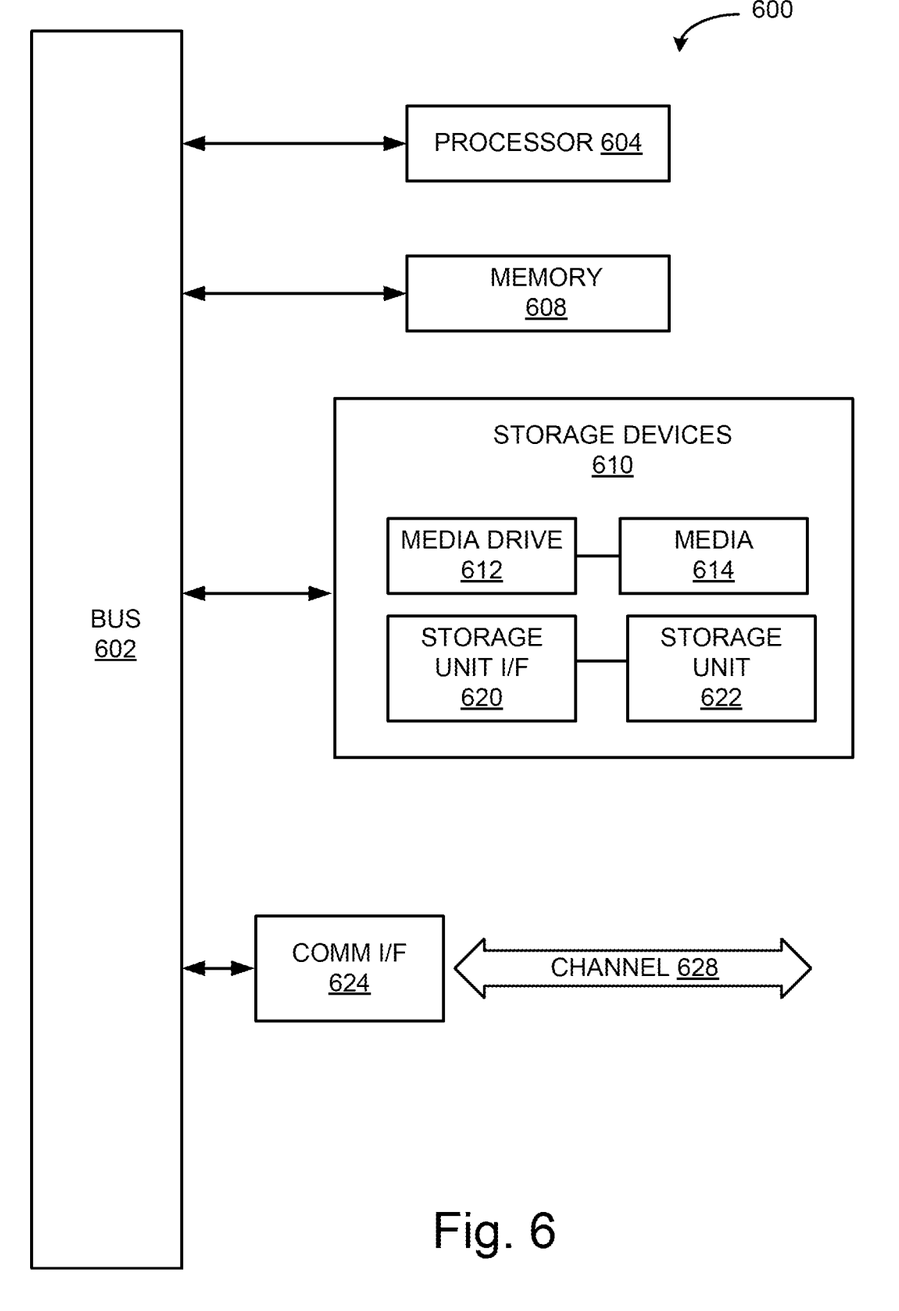
FIG. 6 illustrates an example computing system with which embodiments may be implemented.

As used herein, a circuit or module might be implemented utilizing any form of hardware, software, or a combination thereof. For example, one or more processors, controllers, ASICS, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 6. Various embodiments are described in terms of this example-computing system 600. After reading this description, it will become apparent to a person skilled in the relevant art how to implement the technology using other computing systems or architectures.

Referring now to FIG. 6, computing system 600 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 600 might include, for example, one or more processors, controllers, control modules, or other processing devices, such as a processor 604. Processor 604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 604 is connected to a bus 602, although any communication medium can be used to facilitate interaction with other components of computing system 1000 or to communicate externally.

Computing system 600 might also include one or more memory modules, simply referred to herein as main memory 608. For example, in some embodiments random access memory (RAM) or other dynamic memory, might be used for storing information and instructions to be executed by processor 604. Main memory 608 might also be used for storing temporary variables or other intermediate information during execution of instructions to be executed by processor 604. Computing system 600 might likewise include a read only memory ("ROM") or other static storage device coupled to bus 602 for storing static information and instructions for processor 604.

The computing system 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), a flash drive, or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing system 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a flash drive and associated slot (for example, a USB drive), a PCMCIA slot and card, and other fixed or removable storage units 622 and interfaces 620 that allow software and data to be transferred from the storage unit 622 to computing system 600.

Computing system 600 might also include a communications interface 624. Communications interface 624 might be used to allow software and data to be transferred between computing system 600 and external devices. Examples of communications interface 624 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:
   one or more processors; and
   memory storing machine-executable instructions in non-transitory memory, which when executed by the one or more processors, cause the vehicle to:
   synthesize depth views at multiple viewpoints, wherein synthesizing the depth views at the multiple viewpoints comprises:
   encoding images of an environment surrounding the vehicle into image embeddings, wherein the images are obtained from the multiple viewpoints,
   encoding intrinsic parameters and relatives poses of one or more cameras into camera embeddings, wherein the one or more cameras captured the images,
   projecting the image embeddings and the camera embeddings onto a latent representation for the environment using cross-attention layers of a neural network,
   conditioning the latent representation using self-attention layers of the neural network,
   generating second camera encodings for arbitrary cameras at arbitrary relative poses, and
   querying the conditioned latent representation using the second camera embeddings to synthesize the depth views; and
   perform one or more autonomous operations in response to analysis of the synthesized depth views.

2. The vehicle of claim 1, wherein the one or more processors comprise a geometric scene representation (GSR) component.

3. The vehicle of claim 2, wherein synthesizing depth views comprises depth estimations, depth interpolations, and depth extrapolations.

4. The vehicle of claim 3, wherein the depth extrapolations comprise completed unseen portions of a scene including the surrounding environment for the vehicle.

5. The vehicle of claim 4, wherein the depth extrapolations comprise generated dense depth maps from the multiple viewpoints.

6. The vehicle of claim 5, wherein performing the one or more autonomous operations is in response to the dense depth maps.

7. The vehicle of claim 1, wherein the one or more processors comprise a computer vision component performing one or more computer visual capabilities for the one or more autonomous operations.

8. The vehicle of claim 7, wherein the one or more computer visual capabilities comprise object detection.

9. The vehicle of claim 1, wherein the vehicle comprises an autonomous vehicle.

* * * * *